US012238466B1

(12) United States Patent
Colosi

(10) Patent No.: US 12,238,466 B1
(45) Date of Patent: Feb. 25, 2025

(54) AUTOMATED RESTROOM DISPENSER ASSEMBLY

(71) Applicant: Jason Colosi, Tempe, AZ (US)

(72) Inventor: Jason Colosi, Tempe, AZ (US)

( * ) Notice: Subject to any disclaimer, the term of this patent is extended or adjusted under 35 U.S.C. 154(b) by 0 days.

(21) Appl. No.: 18/236,837

(22) Filed: Aug. 22, 2023

(51) Int. Cl.
*G06Q 10/087* (2023.01)
*G06Q 10/20* (2023.01)
*H04Q 9/02* (2006.01)

(52) U.S. Cl.
CPC .......... *H04Q 9/02* (2013.01); *G06Q 10/087* (2013.01); *G06Q 10/20* (2013.01); *H04Q 2209/40* (2013.01)

(58) Field of Classification Search
None
See application file for complete search history.

(56) References Cited

U.S. PATENT DOCUMENTS

| 10,365,139 | B2 | 7/2019 | Singh | |
|---|---|---|---|---|
| 11,181,413 | B2 | 11/2021 | Kobs | |
| 11,299,386 | B2 | 4/2022 | Slater | |
| 11,594,119 | B2 * | 2/2023 | Le | G08B 21/18 |
| 11,622,656 | B2 | 4/2023 | Ophardt | |
| 2005/0171634 | A1 * | 8/2005 | York | G07F 11/68 |
| | | | | 700/231 |
| 2017/0051486 | A1 * | 2/2017 | Schomburg | A47K 10/18 |
| 2018/0080807 | A1 * | 3/2018 | Singh | B05B 12/004 |
| 2019/0147375 | A1 * | 5/2019 | Ghazi | G06Q 10/20 |
| | | | | 700/236 |
| 2019/0246848 | A1 * | 8/2019 | Elfstrom | H01H 13/18 |
| 2019/0320515 | A1 * | 10/2019 | Sadwick | H05B 45/00 |
| 2021/0335122 | A1 | 10/2021 | Mahmoud | |
| 2022/0338686 | A1 * | 10/2022 | Jolin | G06F 3/0304 |

FOREIGN PATENT DOCUMENTS

| CA | 3075009 A1 * | 9/2020 | G01F 23/292 |
|---|---|---|---|
| EP | 3939482 | 1/2022 | |
| GB | 2589808 A * | 6/2021 | A47K 10/34 |

* cited by examiner

*Primary Examiner* — Curtis A Kuntz
*Assistant Examiner* — Jerold B Murphy

(57) ABSTRACT

An automated restroom dispenser assembly includes a personal electronic device that is carried by a maintenance worker of a public building. A toilet paper dispenser, a paper towel dispenser and a soap dispenser is each mountable in a public restroom located in the public building. A communication unit is integrated into each of the toilet paper dispenser and the paper towel dispenser and the soap dispenser and the communication unit is in remote communication with the personal electronic device. The communication unit associated with each of the toilet paper dispenser or the paper towel dispenser or the soap dispenser communicates a service request to the personal electronic device for refilling the toilet paper dispenser or the paper towel dispenser or the soap dispenser.

9 Claims, 7 Drawing Sheets

AUTOMATED RESTROOM DISPENSER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to restroom dispenser devices and more particularly pertains to a new restroom dispenser device for notifying a maintenance worker to refill toilet paper or paper towels or liquid soap in a public restroom. The device includes a toilet paper dispenser and a paper towel dispenser and a soap dispenser that is each mountable in a public restroom. The device includes a plurality of communication units that are each integrated into a respective toilet paper dispenser and paper towel dispenser and soap dispenser and each of the communication units is in remote communication with a personal electronic device carried by the maintenance worker. In this way the maintenance worker is notified when any of the toilet paper dispenser or the paper towel dispenser or the soap dispenser needs to be replenished.

(2) Description of Related Art Including Information Disclosed Under 37 CFR 1.97 and 1.98

The prior art relates to restroom dispenser devices including a variety of personal care dispensers that have a means of sensing a level of personal care products that are contained in the personal care dispensers and a variety of retrofit level sensors that are attachable to existing personal care dispensers. In no instance does the prior art disclose a toilet paper dispenser and a paper towel dispenser and a soap dispenser that each has a communication unit in wireless communication with a maintenance worker's personal electronic device to notify the maintenance worker to replenish personal care products.

BRIEF SUMMARY OF THE INVENTION

An embodiment of the disclosure meets the needs presented above by generally comprising a personal electronic device that is carried by a maintenance worker of a public building. A toilet paper dispenser, a paper towel dispenser and a soap dispenser is each mountable in a public restroom located in the public building. A communication unit is integrated into each of the toilet paper dispenser and the paper towel dispenser and the soap dispenser and the communication unit is in remote communication with the personal electronic device. The communication unit associated with each of the toilet paper dispenser or the paper towel dispenser or the soap dispenser communicates a service request to the personal electronic device for refilling the toilet paper dispenser or the paper towel dispenser or the soap dispenser.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
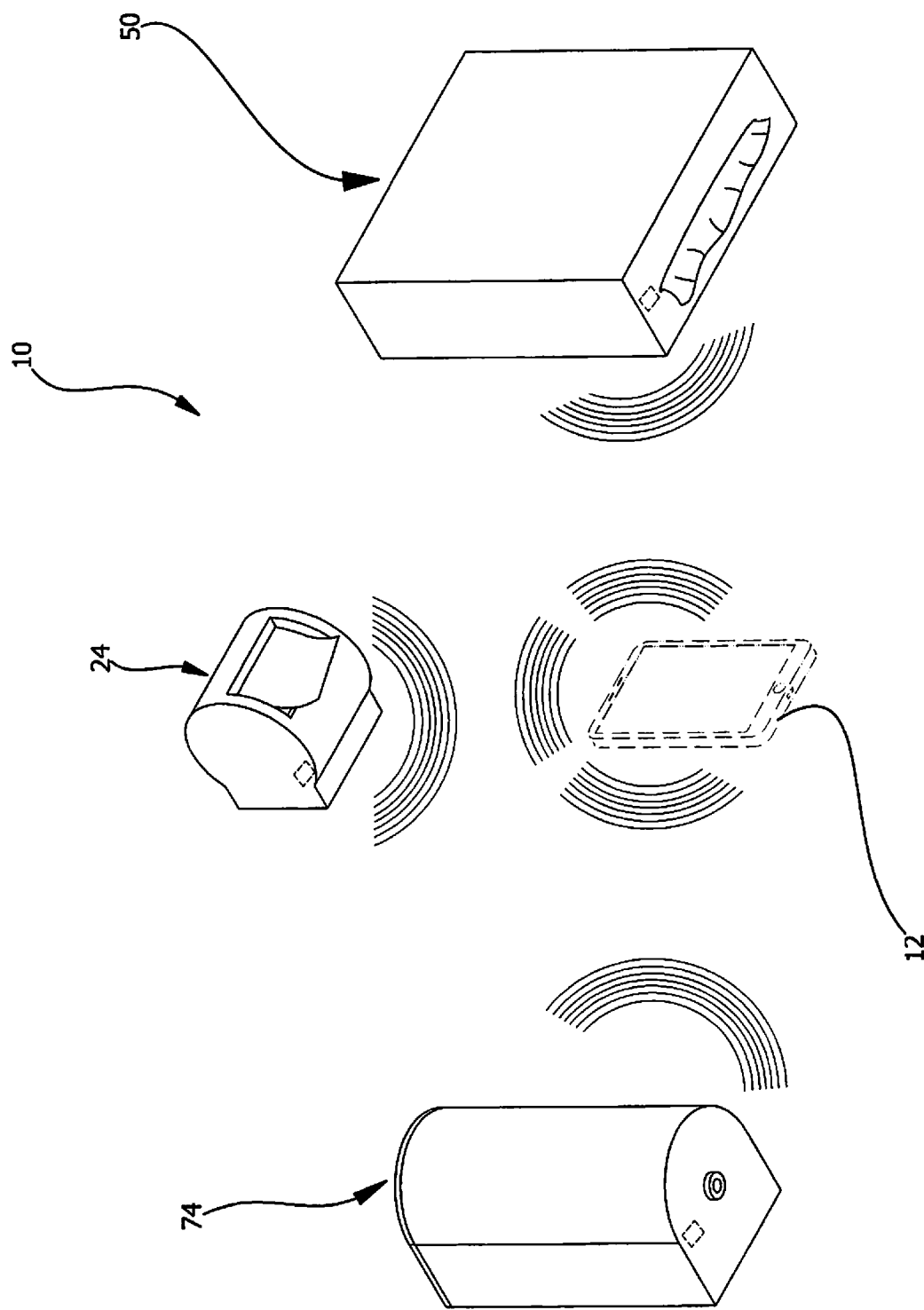
FIG. 1 is a perspective view of an automated restroom dispenser assembly according to an embodiment of the disclosure.
Figure 2:
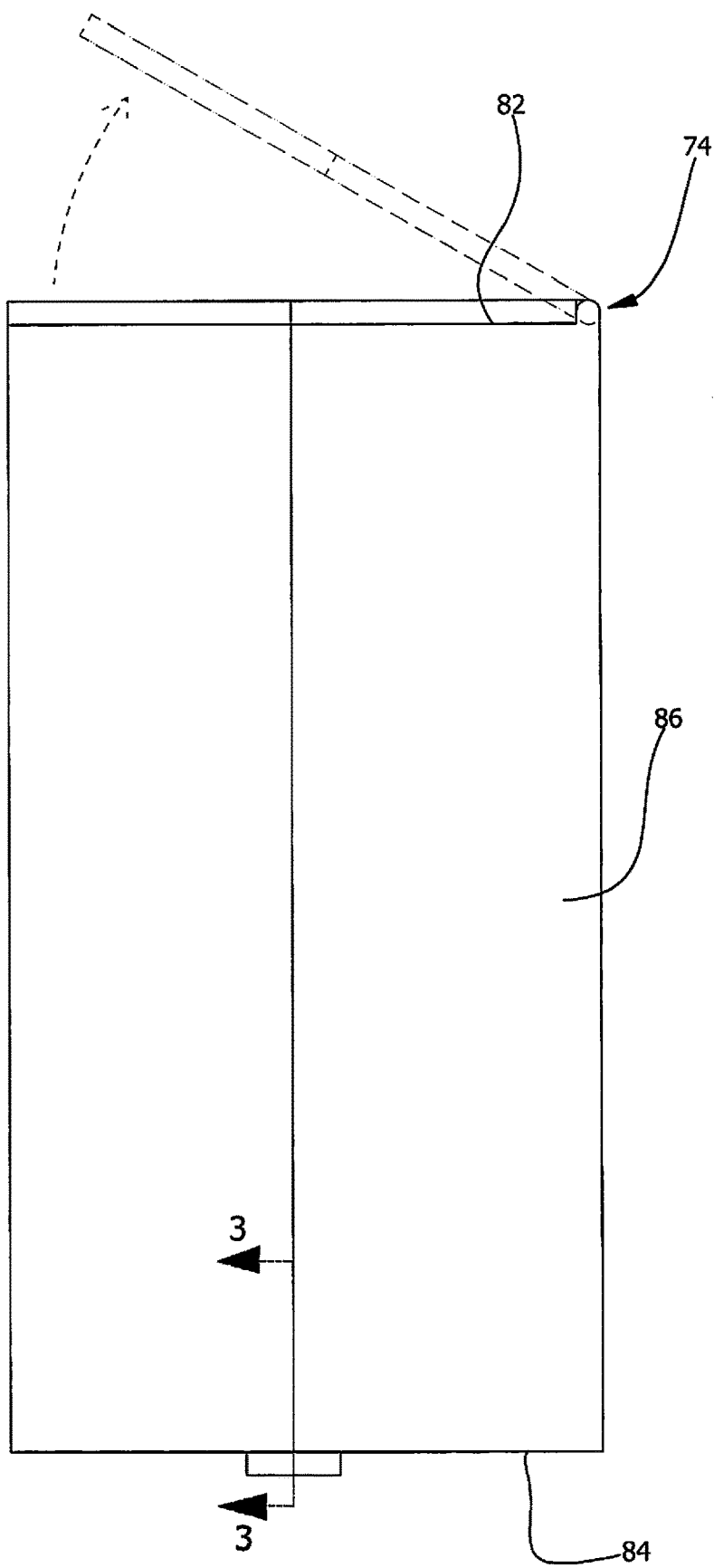
FIG. 2 is a left side view of soap dispenser of an embodiment of the disclosure.
Figure 3:
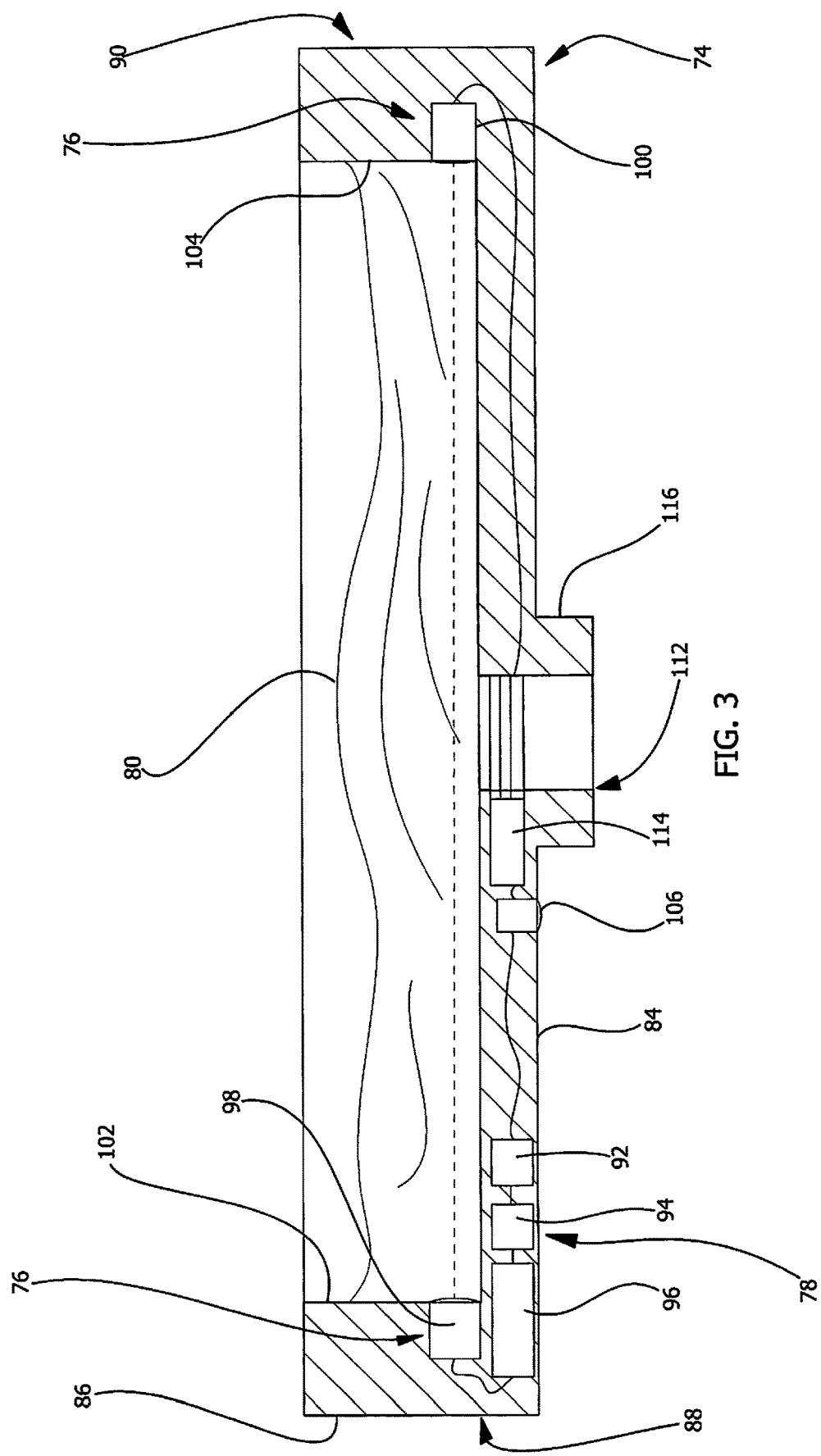
FIG. 3 is a cross sectional view taken along line 3-3 of FIG. 2 of an embodiment of the disclosure.
Figure 4:
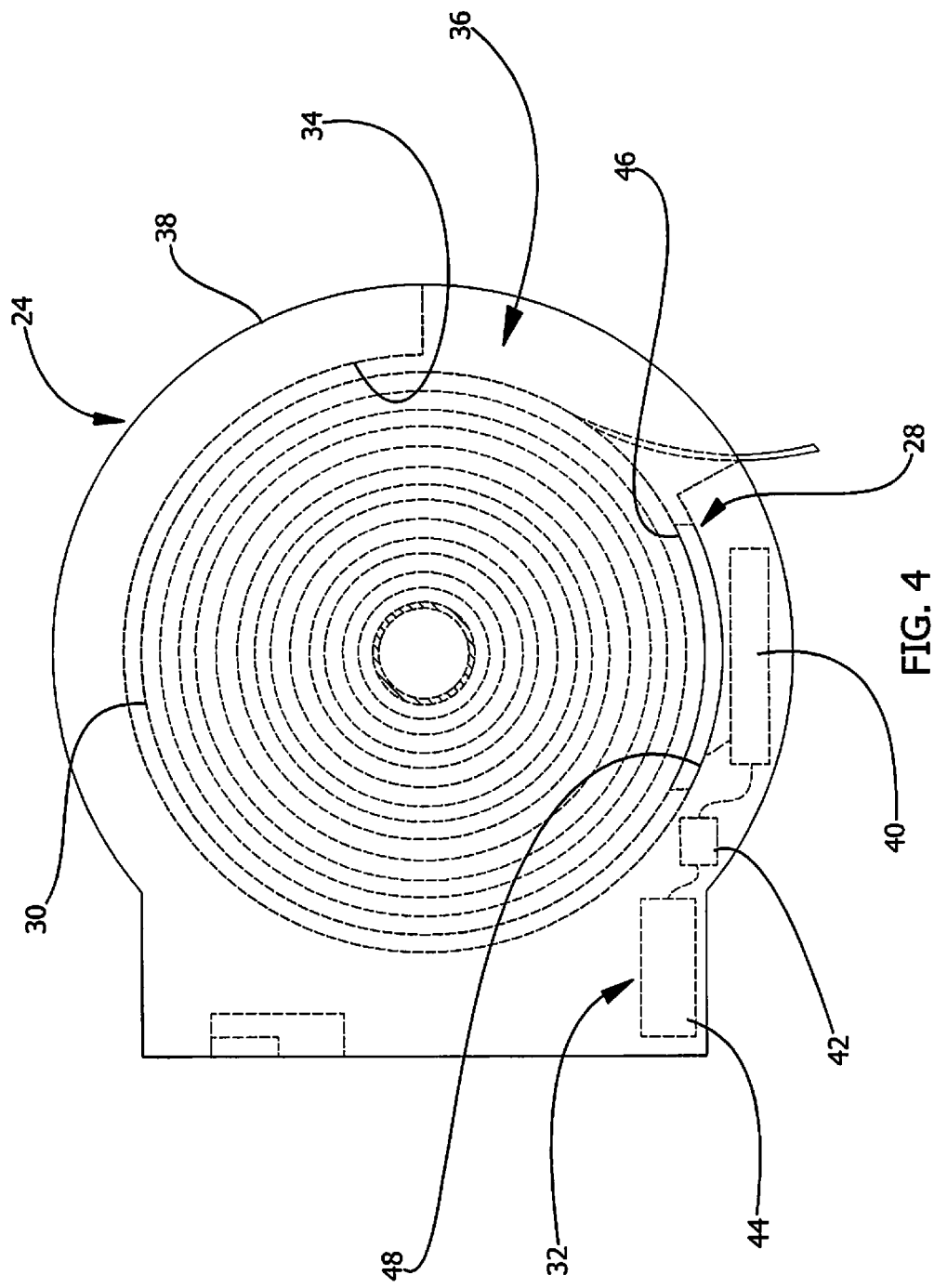
FIG. 4 is a right side phantom view of toilet paper dispenser of an embodiment of the disclosure.
Figure 5:
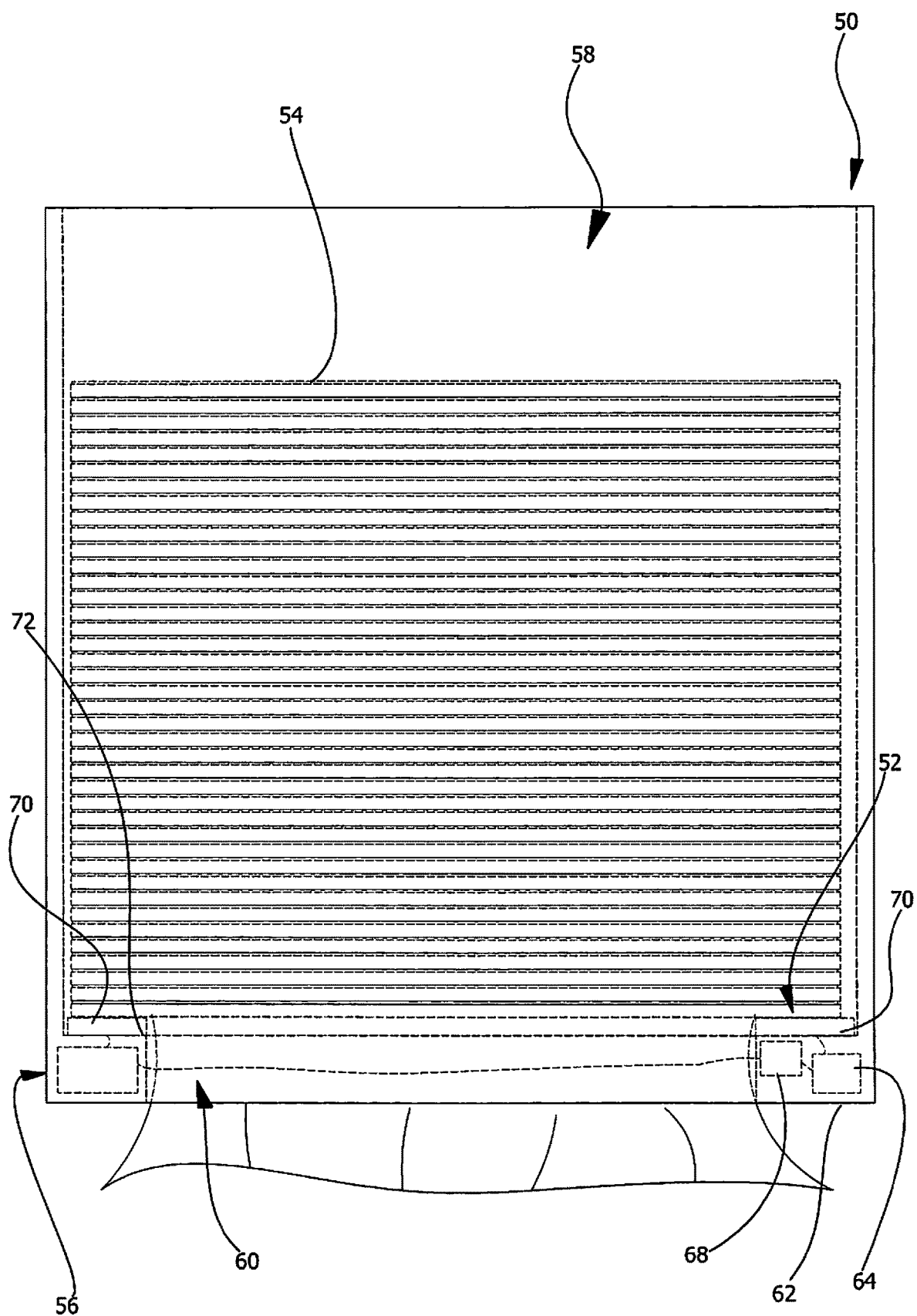
FIG. 5 is a front side phantom view of paper towel dispenser of an embodiment of the disclosure.
Figure 6:
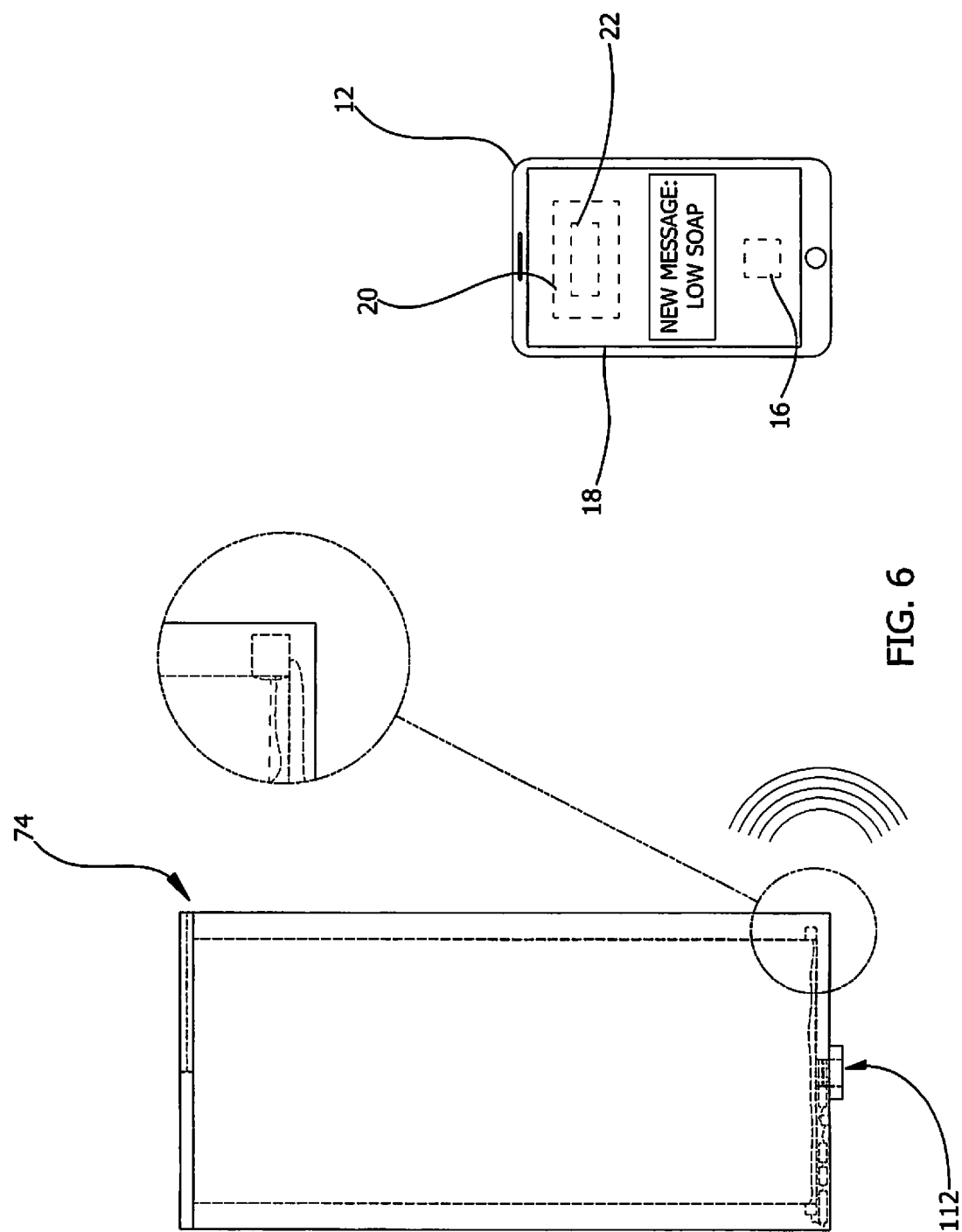
FIG. 6 is a front phantom view of soap dispenser of an embodiment of the disclosure.
Figure 7:
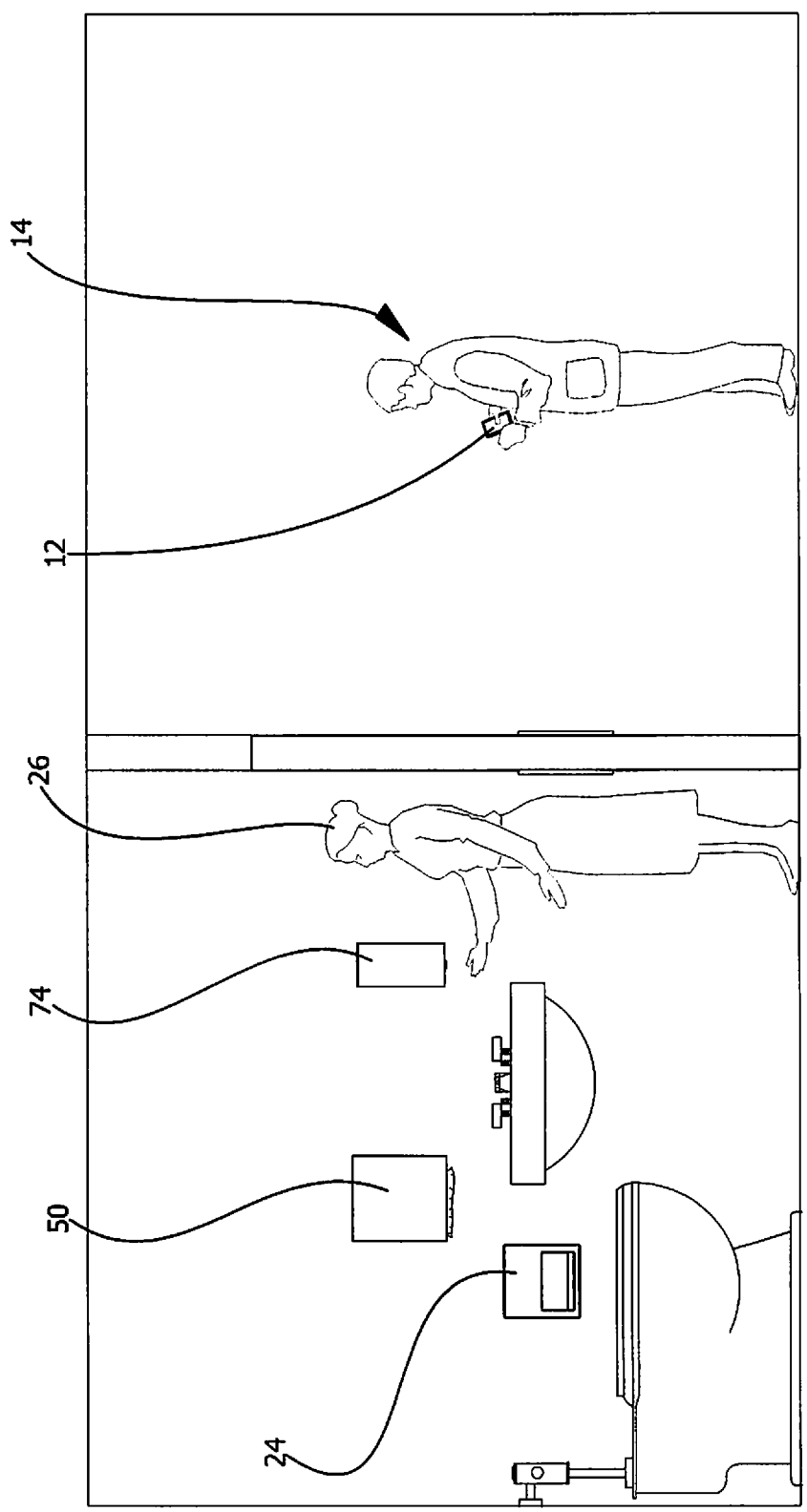
FIG. 7 is a perspective in-use view of an embodiment of the disclosure.

With reference now to the drawings, and in particular to FIGS. 1 through 7 thereof, a new restroom dispenser device embodying the principles and concepts of an embodiment of the disclosure and generally designated by the reference numeral 10 will be described.

As best illustrated in FIGS. 1 through 7, the automated restroom dispenser assembly 10 generally comprises a personal electronic device 12 that is carried by a maintenance worker 14 of a public building. The personal electronic device 12 includes a transceiver 16, a display 18 and data storage 20. The data storage 20 stores a notification application 22 which is selectively triggered to display notification indicia on the display. In this way the display 18 facilitates the maintenance worker 14 to be visually notified of a need for service. The personal electronic device 12 may comprise a smart phone, for example, or other similar electronic device that has wireless communication capabilities.

A toilet paper dispenser 24 is mountable in a public restroom located in the public building such that the toilet paper dispenser 24 is accessible to patrons 26. A toilet paper sensing unit 28 is integrated into the toilet paper dispenser 24 such that the toilet paper sensing unit 28 is in communication with a roll of toilet paper 30 positioned within the toilet paper dispenser 24 for sensing when the roll of toilet paper 30 has become depleted. A toilet paper communication unit 32 is integrated into the toilet paper dispenser 24 and the toilet paper communication unit 32 is in remote communication with the personal electronic device 12. The toilet paper communication unit 32 is in communication with the toilet paper sensing unit 28 and the toilet paper communication unit 32 communicates a service request to the personal electronic device 12 when the toilet paper sensing unit 28 senses that the roll of toilet paper 30 has become depleted. In this way the toilet paper communication unit 32 notifies the maintenance worker 14 to replenish the roll of toilet paper 30.

The toilet paper dispenser 24 has a toilet paper chamber 34 and a dispensing opening 36 extending through an outside wall 38 of the toilet paper dispenser 24 and intersects the toilet paper chamber 34. The roll of toilet paper 30 is positioned in the toilet paper chamber 34 thereby facilitating the toilet paper 30 to be dispensed through the dispensing opening 36. The toilet paper communication unit 32 comprises a toilet paper processor 40 that is integrated into the toilet paper dispenser 24 and the toilet paper processor 40 receives an alert input. The toilet paper communication unit 32 includes a toilet paper transmitter 42 that is integrated into the toilet paper dispenser 24 and the toilet paper transmitter 42 is electrically coupled to the toilet paper processor 40. The toilet paper transmitter 42 is in wireless communication with transceiver 16 in the personal electronic device 12 and the toilet paper transmitter 42 broadcasts an alert signal to the transceiver 16 in the personal electronic device 12 when the toilet paper processor 40 receives the alert input. The toilet paper transmitter 42 may comprise a radio frequency transceiver or the like and the toilet paper transmitter 42 may employ Bluetooth communication protocols to facilitate discrete communication with the personal electronic device 12 carried by the maintenance worker 14.

The toilet paper communication unit 32 includes a toilet paper power supply 44 that is removably integrated into the toilet paper dispenser 24. The toilet paper power supply 44 is electrically coupled to the toilet paper processor 40 and the toilet paper power supply 44 comprises at least one battery. The toilet paper sensing unit 28 comprises a toilet paper sensor 46 that is integrated into the toilet paper dispenser 24 and the toilet paper sensor 46 is electrically coupled to the toilet paper processor 40. Furthermore, the toilet paper sensor 46 rests on a bounding surface 48 of the toilet paper chamber 34 in the toilet paper dispenser 24 such that the toilet paper sensor 46 is directed toward the roll of toilet paper 30. The toilet paper sensor 46 emits a sensing signal toward the roll of toilet paper 30 thereby facilitating the toilet paper sensor 46 to determine the diameter of the roll of toilet paper 30. Furthermore, the toilet paper processor 40 receives the alert input when the toilet paper sensor 46 determines that the diameter of the roll of toilet paper 30 has fallen below a pre-determined trigger diameter. The toilet paper sensor 46 may comprise an optical sensor, a radio frequency sensor or any other type of electronic sensor that employs an electromagnetic signal to remotely measure the distance between the toilet paper sensor 46 and the roll of toilet paper 30.

A paper towel dispenser 50 is mountable in the public restroom such that the paper towel dispenser 50 is accessible to patrons 26. A paper towel sensing unit 52 is integrated into the paper towel dispenser 50 such that the paper towel sensing unit 52 is in communication with a stack of paper towels 54 positioned within the paper towel dispenser 50 for sensing when the stack of paper towels 54 has become depleted. Additionally, a paper towel communication unit 56 is integrated into the paper towel dispenser 50 and the paper towel communication unit 56 is in remote communication with the personal electronic device 12. The paper towel communication unit 56 is in communication with the paper towel sensing unit 52 and the paper towel communication unit 56 communicating a service request to the personal electronic device 12 when the paper towel sensing unit 52 senses that the stack of paper towels 54 has become depleted. In this way the paper towel communication unit 56 can notify the maintenance worker 14 to replenish the stack of paper towels 54.

The paper towel dispenser 50 has a paper towel chamber 58 and a dispensing opening 60 extending through a bottom wall 62 of the paper towel dispenser 50 and intersecting the paper towel chamber 58. The stack of paper towels 54 is positioned in the paper towel chamber 58 thereby facilitating the stack of paper towels 54 to be dispensed through the dispensing opening 60 in the paper towel dispenser 50. The paper towel communication unit 56 comprises a paper towel processor 64 that is integrated into the paper towel dispenser 50 and the paper towel processor 64 receives an alert input. The paper towel communication unit 56 includes a paper towel transmitter 66 that is integrated into the paper towel dispenser 50 and the paper towel transmitter 66 is electrically coupled to the paper towel processor 64. Additionally, the paper towel transmitter 66 is in wireless communication with transceiver 16 in the personal electronic device 12 and the paper towel transmitter 66 broadcasts an alert signal to the transceiver 16 in the personal electronic device 12 when the paper towel processor 64 receives the alert input. The paper towel transmitter 66 may comprise a radio frequency transmitter or the like and the paper towel transmitter 66 may employ Bluetooth communication protocols to facilitate discrete communication with the personal electronic device 12 carried by the maintenance worker 14.

The paper towel communication unit 56 includes a paper towel power supply 68 that is removably integrated into the paper towel dispenser 50. The paper towel power supply 68 is electrically coupled to the paper towel processor 64 and the paper towel power supply 68 comprises at least one battery. The paper towel sensing unit 52 comprises a pair of weight sensors 70 that is each integrated into the paper towel dispenser 50 and each of the weight sensors 70 is electrically coupled to the paper towel processor 64. Each of the weight sensors 70 rests on a top surface 72 of the bottom wall 62 of the paper towel dispenser 50 such that the stack of paper towels 54 rests on the pair of weight sensors 70. Additionally, each of the pair of weight sensors 70 is positioned adjacent to opposite ends of the dispensing opening 36 in the paper towel dispenser 50. The paper towel processor 64 receives the alert input when the pair of weight sensors 70 determines that the weight of the stack of paper towels 54 has fallen below a pre-determined trigger weight. The pre-determined trigger weight may range between approximately 20.0 grams and 30.0 grams.

A soap dispenser 74 is mountable in the public restroom such that the soap dispenser 74 is accessible to patrons 26. The soap dispenser 74 has a pair of level sensors 76 that is each integrated into the soap dispenser 74 such that each of the level sensors 76 is in communication with liquid soap 80 contained in the soap dispenser 74. A soap communication unit 78 is integrated into the soap dispenser 74 and the soap communication unit 78 is in remote communication with the personal electronic device 12. The soap communication unit 78 is in communication with the pair of level sensors 76 and the soap communication unit 78 communicates a service request to the personal electronic device 12 when the pair of level sensors 76 senses that the liquid soap 80 has become depleted. In this way the soap communication unit 78 can notify the maintenance worker 14 to replenish the liquid soap 80.

The soap dispenser 74 has a top wall 82, a bottom wall 84 and an outside wall 86 extending between the top wall 82 and the bottom wall 84. The soap dispenser 74 has a fill opening 87 extending through the top wall 82 for filling the soap dispenser 74 with the liquid soap 80 and the outside wall 86 has a front side 88 and a back side 90. The soap communication unit 78 comprises a soap processor 92 that is integrated into the soap dispenser 74 and the soap processor 92 receives an alert input and a dispense input. The soap communication unit 78 includes a soap transmitter 94 that is integrated into the soap dispenser 74 and the soap transmitter 94 is electrically coupled to the soap processor 92. The soap transmitter 94 is in wireless communication with transceiver 16 in the personal electronic device 12 and the soap transmitter 94 broadcasts an alert signal to the transceiver 16 in the personal electronic device 12 when the soap processor 92 receives the alert input. Furthermore, the soap transmitter 94 may comprise a radio frequency transmitter or the like and the soap transmitter 94 may employ Bluetooth communication protocols to facilitate discrete communication with the personal electronic device 12 carried by the maintenance worker 14.

The soap communication unit 78 includes a soap power supply 96 that is removably integrated into the soap dispenser 74. The soap power supply 96 is electrically coupled to the soap processor 92 and the soap power supply 96 comprises at least one battery. The pair of level sensors 76 includes an emitting sensor 98 and a receiving sensor 100 and each of the emitting sensor 98 and the receiving sensor 100 is electrically coupled to the soap processor 92. The emitting sensor 98 is integrated into an inside surface 102 of the front side 88 of the outside wall 86 of the soap dispenser 74 and the emitting sensor 98 is positioned adjacent to the bottom wall 84 of the soap dispenser 74. The receiving sensor 100 is integrated into an inside surface 104 of the back side 90 of the outside wall 86 and the receiving sensor 100 is aligned with the emitting sensor 98. Additionally, the emitting sensor 98 emits a communication signal to the receiving sensor 100 and the liquid soap 80 blocks the communication signal from reaching the receiving sensor 100. The soap processor 92 receives the alert input when a level of the liquid soap 80 falls below the emitting sensor 98 and the receiving sensor 100 such that the receiving sensor 100 receives the communication signal. The emitting sensor 98 may comprise a light emitter which emits a cohesive beam of light and the receiving sensor 100 may be a light sensor for detecting the cohesive beam of light.

A motion sensor 106 is integrated into a bottom surface 108 of the bottom wall 84 of the soap dispenser 74 to sense motion of the patron's hand 110 being positioned beneath the soap dispenser 74. The motion sensor 106 is electrically coupled to the soap processor 92 and the soap processor 92 receives the dispense input when the motion sensor 106 senses motion. The motion sensor 106 may comprise an infra-red motion sensor or other type of electronic motion sensor 106 that has a sensitivity range of less than 30.0 cm. A dispensing unit 112 is integrated into the bottom wall 84 of the soap dispenser 74 and the dispensing unit 112 includes an actuator 114 and a nozzle 116. The actuator 114 is electrically coupled to the soap processor 92 and the nozzle 116 releases a pre-determined volume of the liquid soap 80 each time the actuator 114 is actuated. The actuator 114 is actuated each time the soap processor 92 receives the dispense input and the actuator 114 may comprise an electromechanical linear actuator or other similar type of actuator.

In use, the maintenance worker 14 synchs their personal electronic device 12 with the toilet paper communication unit 32 and the paper towel communication unit 56 and the soap communication unit 78. In this way the notification application 22 will generate a visual alert on the display 18 of the personal electronic device 12 that corresponds to either the toilet paper 30 needing to be replenished or the paper towels 54 needing to be replenished or the liquid soap 80 needing to be replenished. Thus, the maintenance worker 14 can ensure that the patrons 26 can utilize the restroom while always having adequate toilet paper 30 and paper towels 54 and liquid soap 80. Furthermore, the notification application 22 generates a visual alert to notify the maintenance worker 14 when any of the toilet paper power supply 44 or the paper towel power supply 68 or the soap power supply 96 is running low and needs to be replaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated restroom dispenser assembly for wirelessly notifying a maintenance worker that one or more personal care products in a restroom needs to be replenished, said assembly comprising:
   a personal electronic device being configured to be carried by a maintenance worker of a public building;
   a toilet paper dispenser being mountable in a public restroom located in the public building wherein said toilet paper dispenser is configured to be accessible to patrons, said toilet paper dispenser having a toilet paper sensing unit being integrated into said toilet paper dispenser such that said toilet paper sensing unit is in communication with a roll of toilet paper positioned within said toilet paper dispenser for sensing when said roll of toilet paper has become depleted, said toilet paper dispenser having a toilet paper communication unit being integrated into said toilet paper dispenser, said toilet paper communication unit being in remote communication with said personal electronic device, said toilet paper communication unit being in communication with said toilet paper sensing unit, said toilet paper communication unit communicating a service request to said personal electronic device when said toilet paper sensing unit senses that said roll of toilet paper has become depleted wherein said toilet paper communication unit is configured to notify the maintenance worker to replenish said roll of toilet paper;

a paper towel dispenser being mountable in the public restroom wherein said paper towel dispenser is configured to be accessible to patrons, said paper towel dispenser having a paper towel sensing unit being integrated into said paper towel dispenser such that said paper towel sensing unit is in communication with a stack of paper towels positioned within said paper towel dispenser for sensing when said stack of paper towels has become depleted, said paper towel dispenser having a paper towel communication unit being integrated into said paper towel dispenser, said paper towel communication unit being in remote communication with said personal electronic device, said paper towel communication unit being in communication with said paper towel sensing unit, said paper towel communication unit communicating a service request to said personal electronic device when said paper towel sensing unit senses that said stack of paper towels has become depleted wherein said paper towel communication unit is configured to notify the maintenance worker to replenish said stack of paper towels;

a soap dispenser being mountable in the public restroom wherein said soap dispenser is configured to be accessible to patrons, said soap dispenser having a pair of level sensors each being integrated into said soap dispenser such that each of said level sensors is in communication with liquid soap contained in said soap dispenser, said soap dispenser having a soap communication unit being integrated into said soap dispenser, said soap communication unit being in remote communication with said personal electronic device, said soap communication unit being in communication with said pair of level sensors, said soap communication unit communicating a service request to said personal electronic device when said pair of level sensors senses that the liquid soap has become depleted wherein said soap communication unit is configured to notify the maintenance worker to replenish said liquid soap;

wherein said personal electronic device includes a transceiver and a display and data storage, said data storage storing a notification application which is selectively triggered to display notification indicia on said display wherein said display is configured to facilitate the maintenance worker to be visually notified of a need for service; and wherein said toilet paper communication unit includes:

a toilet paper processor being integrated into said toilet paper dispenser, said toilet paper processor receiving an alert input;

a toilet paper transmitter being integrated into said toilet paper dispenser, said toilet paper transmitter being electrically coupled to said toilet paper processor, said toilet paper transmitter being in wireless communication with transceiver in said personal electronic device, said toilet paper transmitter broadcasting an alert signal to said transceiver in said personal electronic device when said toilet paper processor receives said alert input; and a toilet paper power supply being removably integrated into said toilet paper dispenser, said toilet paper power supply being electrically coupled to said toilet paper processor, said toilet paper power supply comprising at least one battery.

2. The assembly according to claim 1, further comprising:

said toilet paper sensing unit senses that said roll of toilet paper has become depleted wherein said toilet paper communication unit is configured to notify the maintenance worker to replenish said roll of toilet paper, said toilet paper dispenser having a toilet paper chamber and a dispensing opening extending through an outer wall of said toilet paper dispenser and intersecting said toilet paper chamber, said roll of toilet paper being positioned in said toilet paper chamber thereby facilitating said toilet paper to be dispensed through said dispensing opening;

said toilet paper sensing unit comprises a toilet paper sensor being integrated into said toilet paper dispenser, said toilet paper sensor being electrically coupled to said toilet paper processor, said toilet paper sensor resting on a bounding surface of said toilet paper chamber in said toilet paper dispenser such that said toilet paper sensor is directed toward said roll of toilet paper, said toilet paper sensor emitting a sensing signal toward said roll of toilet paper thereby facilitating said toilet paper sensor to determine the diameter of said roll of toilet paper, said toilet paper processor receiving said alert input when said toilet paper sensor determines that said diameter of said roll of toilet paper has fallen below a pre-determined trigger diameter;

said paper towel dispenser having a paper towel chamber and a dispensing opening extending through a bottom wall of said paper towel dispenser and intersecting said paper towel chamber, said stack of paper towels being positioned in said paper towel chamber thereby facilitating said stack of paper towels to be dispensed through said dispensing opening in said paper towel dispenser, said paper towel communication unit comprising:

a paper towel processor being integrated into said paper towel dispenser, said paper towel processor receiving an alert input;

a paper towel transmitter being integrated into said paper towel dispenser, said paper towel transmitter being electrically coupled to said paper towel processor, said paper towel transmitter being in wireless communication with transceiver in said personal electronic device, said paper towel transmitter broadcasting an alert signal to said transceiver in said personal electronic device when said paper towel processor receives said alert input; and a paper towel power supply being removably integrated into said paper towel dispenser, said paper towel power supply being electrically coupled to said paper towel processor, said paper towel power supply comprising at least one battery;

said paper towel sensing unit comprises a pair of weight sensors each being integrated into said paper towel dispenser, each of said weight sensors being electrically coupled to said paper towel processor, each of said weight sensors resting on a top surface of said bottom wall of said paper towel dispenser such that said stack of paper towels rests on said pair of weight sensors, each of said pair of weight sensors being positioned adjacent to opposite ends of said dispensing opening in said paper towel dispenser, said paper towel processor receiving said alert input when said pair of weight sensors determines that the weight of said stack of paper towels has fallen below a pre-determined trigger weight;

said soap dispenser having a top wall and a bottom wall and an outside wall extending between said top wall and said bottom wall, said soap dispenser having a fill opening extending through said top wall for filling said soap dispenser with said liquid soap, said outside wall having a front side and a back side, said soap communication unit comprising:
  a soap processor being integrated into said soap dispenser, said soap processor receiving an alert input and a dispense input;
  a soap transmitter being integrated into said soap dispenser, said soap transmitter being electrically coupled to said soap processor, said soap transmitter being in wireless communication with transceiver in said personal electronic device, said soap transmitter broadcasting an alert signal to said transceiver in said personal electronic device when said soap processor receives said alert input; and
  a soap power supply being removably integrated into said soap dispenser, said soap power supply being electrically coupled to said soap processor, said soap power supply comprising at least one battery;

wherein said pair of level sensors includes an emitting sensor and a receiving sensor, each of said emitting sensor and said receiving sensor being electrically coupled to said soap processor, said emitting sensor being integrated into an inside surface of said front side of said outside wall of said soap dispenser, said emitting sensor being positioned adjacent to said bottom wall of said outside wall, said receiving sensor being integrated into an inside surface of said back side of said outside wall, said receiving sensor being aligned with said emitting sensor, said emitting sensor emitting a communication signal to said receiving sensor, said liquid soap blocking said communication signal from reaching said receiving sensor, said soap processor receiving said alert input when a level of said liquid soap falls below said emitting sensor and said receiving sensor such that said receiving sensor receives said communication signal;

wherein said soap dispenser includes a motion sensor being integrated into a bottom surface of said bottom wall of said soap dispenser wherein said motion sensor is configured to sense motion of the patron's hand being positioned beneath said soap dispenser, said motion sensor being electrically coupled to said soap processor, said soap processor receiving said dispense input when said motion sensor senses motion; and wherein said soap dispenser includes a dispensing unit being integrated into said bottom wall of said soap dispenser, said dispensing unit including an actuator and a nozzle, said actuator being electrically coupled to said soap processor, said nozzle releasing a pre-determined volume of said liquid soap each time said actuator is actuated, said actuator being actuated each time said soap processor receives said dispense input.

3. The assembly according to claim 1, wherein:

said toilet paper dispenser has a toilet paper chamber and a dispensing opening extending through an outer wall of said toilet paper dispenser and intersecting said toilet paper chamber, said roll of toilet paper being positioned in said toilet paper chamber thereby facilitating said toilet paper to be dispensed through said dispensing opening; and said toilet paper sensing unit comprises a toilet paper sensor being integrated into said toilet paper dispenser, said toilet paper sensor being electrically coupled to said toilet paper processor, said toilet paper sensor resting on a bounding surface of said toilet paper chamber in said toilet paper dispenser such that said toilet paper sensor is directed toward said roll of toilet paper, said toilet paper sensor emitting a sensing signal toward said roll of toilet paper thereby facilitating said toilet paper sensor to determine the diameter of said roll of toilet paper, said toilet paper processor receiving said alert input when said toilet paper sensor determines that said diameter of said roll of toilet paper has fallen below a pre-determined trigger diameter.

4. An automated restroom dispenser assembly for wirelessly notifying a maintenance worker that one or more personal care products in a restroom needs to be replenished, said assembly comprising:

a personal electronic device being configured to be carried by a maintenance worker of a public building;

a toilet paper dispenser being mountable in a public restroom located in the public building wherein said toilet paper dispenser is configured to be accessible to patrons, said toilet paper dispenser having a toilet paper sensing unit being integrated into said toilet paper dispenser such that said toilet paper sensing unit is in communication with a roll of toilet paper positioned within said toilet paper dispenser for sensing when said roll of toilet paper has become depleted, said toilet paper dispenser having a toilet paper communication unit being integrated into said toilet paper dispenser, said toilet paper communication unit being in remote communication with said personal electronic device, said toilet paper communication unit being in communication with said toilet paper sensing unit, said toilet paper communication unit communicating a service request to said personal electronic device when said toilet paper sensing unit senses that said roll of toilet paper has become depleted wherein said toilet paper communication unit is configured to notify the maintenance worker to replenish said roll of toilet paper;

a paper towel dispenser being mountable in the public restroom wherein said paper towel dispenser is configured to be accessible to patrons, said paper towel dispenser having a paper towel sensing unit being integrated into said paper towel dispenser such that said paper towel sensing unit is in communication with a stack of paper towels positioned within said paper towel dispenser for sensing when said stack of paper towels has become depleted, said paper towel dispenser having a paper towel communication unit being integrated into said paper towel dispenser, said paper towel communication unit being in remote communication with said personal electronic device, said paper towel communication unit being in communication with said paper towel sensing unit, said paper towel communication unit communicating a service request to said personal electronic device when said paper towel sensing unit senses that said stack of paper towels has become depleted wherein said paper towel communication unit is configured to notify the maintenance worker to replenish said stack of paper towels;

a soap dispenser being mountable in the public restroom wherein said soap dispenser is configured to be accessible to patrons, said soap dispenser having a pair of level sensors each being integrated into said soap dispenser such that each of said level sensors is in communication with liquid soap contained in said soap dispenser, said soap dispenser having a soap communication unit being integrated into said soap dispenser, said soap communication unit being in remote communication with said personal electronic device, said soap communication unit being in communication with said pair of level sensors, said soap communication unit communicating a service request to said personal electronic device when said pair of level sensors senses that the liquid soap has become depleted wherein said soap communication unit is configured to notify the maintenance worker to replenish said liquid soap;

wherein said personal electronic device includes a transceiver and a display and data storage, said data storage storing a notification application which is selectively triggered to display notification indicia on said display wherein said display is configured to facilitate the maintenance worker to be visually notified of a need for service; and wherein said paper towel communication unit comprises:
- a paper towel processor being integrated into said paper towel dispenser, said paper towel processor receiving an alert input;
- a paper towel transmitter being integrated into said paper towel dispenser, said paper towel transmitter being electrically coupled to said paper towel processor, said paper towel transmitter being in wireless communication with transceiver in said personal electronic device, said paper towel transmitter broadcasting an alert signal to said transceiver in said personal electronic device when said paper towel processor receives said alert input; and
- a paper towel power supply being removably integrated into said paper towel dispenser, said paper towel power supply being electrically coupled to said paper towel processor, said paper towel power supply comprising at least one battery.

5. The assembly according to claim 4, wherein:

said paper towel dispenser has a paper towel chamber and a dispensing opening extending through a bottom wall of said paper towel dispenser and intersecting said paper towel chamber, said stack of paper towels being positioned in said paper towel chamber thereby facilitating said stack of paper towels to be dispensed through said dispensing opening in said paper towel dispenser; and said paper towel sensing unit comprises a pair of weight sensors each being integrated into said paper towel dispenser, each of said weight sensors being electrically coupled to said paper towel processor, each of said weight sensors resting on a top surface of said bottom wall of said paper towel dispenser such that said stack of paper towels rests on said pair of weight sensors, each of said pair of weight sensors being positioned adjacent to opposite ends of said dispensing opening in said paper towel dispenser, said paper towel processor receiving said alert input when said pair of weight sensors determines that the weight of said stack of paper towels has fallen below a pre-determined trigger weight.

6. An automated restroom dispenser assembly for wirelessly notifying a maintenance worker that one or more personal care products in a restroom needs to be replenished, said assembly comprising:

a personal electronic device being configured to be carried by a maintenance worker of a public building;

a toilet paper dispenser being mountable in a public restroom located in the public building wherein said toilet paper dispenser is configured to be accessible to patrons, said toilet paper dispenser having a toilet paper sensing unit being integrated into said toilet paper dispenser such that said toilet paper sensing unit is in communication with a roll of toilet paper positioned within said toilet paper dispenser for sensing when said roll of toilet paper has become depleted, said toilet paper dispenser having a toilet paper communication unit being integrated into said toilet paper dispenser, said toilet paper communication unit being in remote communication with said personal electronic device, said toilet paper communication unit being in communication with said toilet paper sensing unit, said toilet paper communication unit communicating a service request to said personal electronic device when said toilet paper sensing unit senses that said roll of toilet paper has become depleted wherein said toilet paper communication unit is configured to notify the maintenance worker to replenish said roll of toilet paper;

a paper towel dispenser being mountable in the public restroom wherein said paper towel dispenser is configured to be accessible to patrons, said paper towel dispenser having a paper towel sensing unit being integrated into said paper towel dispenser such that said paper towel sensing unit is in communication with a stack of paper towels positioned within said paper towel dispenser for sensing when said stack of paper towels has become depleted, said paper towel dispenser having a paper towel communication unit being integrated into said paper towel dispenser, said paper towel communication unit being in remote communication with said personal electronic device, said paper towel communication unit being in communication with said paper towel sensing unit, said paper towel communication unit communicating a service request to said personal electronic device when said paper towel sensing unit senses that said stack of paper towels has become depleted wherein said paper towel communication unit is configured to notify the maintenance worker to replenish said stack of paper towels;

a soap dispenser being mountable in the public restroom wherein said soap dispenser is configured to be accessible to patrons, said soap dispenser having a pair of level sensors each being integrated into said soap dispenser such that each of said level sensors is in communication with liquid soap contained in said soap dispenser, said soap dispenser having a soap communication unit being integrated into said soap dispenser, said soap communication unit being in remote communication with said personal electronic device, said soap communication unit being in communication with said pair of level sensors, said soap communication unit communicating a service request to said personal electronic device when said pair of level sensors senses that the liquid soap has become depleted wherein said soap communication unit is configured to notify the maintenance worker to replenish said liquid soap;

wherein said personal electronic device includes a transceiver and a display and data storage, said data storage storing a notification application which is selectively triggered to display notification indicia on said display wherein said display is configured to facilitate the maintenance worker to be visually notified of a need for service; and wherein said soap communication unit comprises:
- a soap processor being integrated into said soap dispenser, said soap processor receiving an alert input and a dispense input;
- a soap transmitter being integrated into said soap dispenser, said soap transmitter being electrically coupled to said soap processor, said soap transmitter being in wireless communication with transceiver in said personal electronic device, said soap transmitter broadcasting an alert signal to said transceiver in said personal electronic device when said soap processor receives said alert input; and
- a soap power supply being removably integrated into said soap dispenser, said soap power supply being electrically coupled to said soap processor, said soap power supply comprising at least one battery.

7. The assembly according to claim 6, wherein:

said soap dispenser has a top wall and a bottom wall and an outside wall extending between said top wall and said bottom wall, said soap dispenser having a fill opening extending through said top wall for filling said soap dispenser with said liquid soap, said outside wall having a front side and a back side;

wherein said pair of level sensors includes an emitting sensor and a receiving sensor, each of said emitting sensor and said receiving sensor being electrically coupled to said soap processor;

said emitting sensor is integrated into an inside surface of said front side of said outside wall of said soap dispenser, said emitting sensor being positioned adjacent to said bottom wall of said outside wall;

said receiving sensor is integrated into an inside surface of said back side of said outside wall, said receiving sensor being aligned with said emitting sensor; and said emitting sensor emits a communication signal to said receiving sensor, said liquid soap blocking said communication signal from reaching said receiving sensor, said soap processor receiving said alert input when a level of said liquid soap falls below said emitting sensor and said receiving sensor such that said receiving sensor receives said communication signal.

8. The assembly according to claim 6, wherein said soap dispenser includes a motion sensor being integrated into a bottom surface of said bottom wall of said soap dispenser wherein said motion sensor is configured to sense motion of the patron's hand being positioned beneath said soap dispenser, said motion sensor being electrically coupled to said soap processor, said soap processor receiving said dispense input when said motion sensor senses motion.

9. The assembly according to claim 6, wherein said soap dispenser includes a dispensing unit being integrated into said bottom wall of said soap dispenser, said dispensing unit including an actuator and a nozzle, said actuator being electrically coupled to said soap processor, said nozzle releasing a pre-determined volume of said liquid soap each time said actuator is actuated, said actuator being actuated each time said soap processor receives said dispense input.

\* \* \* \* \*